United States Patent [19]
Hatam-Tabrizi

[11] Patent Number: 6,104,675
[45] Date of Patent: Aug. 15, 2000

[54] METHOD AND APPARATUS FOR READING AND WRITING MAGNETO-OPTICAL MEDIA

[75] Inventor: Shahab Hatam-Tabrizi, San Jose, Calif.

[73] Assignee: Maxoptix Corporation, Fremont, Calif.

[21] Appl. No.: 09/026,798

[22] Filed: Feb. 20, 1998

[51] Int. Cl.[7] ................................................ G11B 11/00
[52] U.S. Cl. ............................................. 369/13; 369/112
[58] Field of Search ................................ 369/13, 14, 110, 369/116, 112, 44.14, 44.22; 360/114, 59

[56] References Cited

U.S. PATENT DOCUMENTS

| | | |
|---|---|---|
| 4,449,138 | 5/1984 | Ando . |
| 4,788,671 | 11/1988 | Kanda . |
| 4,807,204 | 2/1989 | Mizutani et al. ........................... 369/13 |
| 4,965,780 | 10/1990 | Lee et al. ................................... 369/13 |
| 5,004,307 | 4/1991 | Kino et al. ................................ 350/1.2 |
| 5,105,408 | 4/1992 | Lee et al. .............................. 369/44.15 |
| 5,121,256 | 6/1992 | Corle et al. ............................. 359/664 |
| 5,125,750 | 6/1992 | Corle et al. ............................. 359/819 |
| 5,150,338 | 9/1992 | Birecki et al. ............................. 369/13 |
| 5,161,134 | 11/1992 | Lee ............................................ 369/13 |
| 5,191,563 | 3/1993 | Lee et al. ................................... 369/13 |
| 5,197,050 | 3/1993 | Murakami et al. ....................... 369/13 |
| 5,202,880 | 4/1993 | Lee et al. ................................. 369/275 |
| 5,247,510 | 9/1993 | Lee et al. ................................. 369/118 |
| 5,255,260 | 10/1993 | Yamada et al. . |
| 5,276,674 | 1/1994 | Tanaka . |
| 5,307,336 | 4/1994 | Lee et al. ................................. 369/112 |
| 5,497,359 | 3/1996 | Mamin et al. ......................... 369/44.15 |
| 5,533,001 | 7/1996 | Watanabe et al. . |
| 5,712,842 | 1/1998 | Yamamoto et al. ..................... 369/112 |
| 5,745,443 | 4/1998 | Yoshida et al. ........................... 369/13 |
| 5,745,464 | 4/1998 | Taguchi et al. ........................... 369/59 |
| 5,786,078 | 7/1998 | Sekiya et al. ............................ 428/332 |
| 5,790,483 | 8/1998 | Kawai ....................................... 369/13 |
| 5,828,644 | 10/1998 | Gage et al. .............................. 369/112 |
| 5,838,646 | 11/1998 | Watanabe et al. . |
| 5,859,814 | 1/1999 | Kino et al. ................................ 369/13 |
| 5,910,932 | 6/1999 | Watanabe et al. . |
| 5,914,915 | 6/1999 | Watanabe et al. . |

FOREIGN PATENT DOCUMENTS 8-212579  8/1996  Japan ....................................... 369/13

*Primary Examiner*—Tan Dinh
*Attorney, Agent, or Firm*—Blakely Sokoloff Taylor & Zafman, LLP

[57] ABSTRACT

A method and apparatus for magneto-optical storage and access of data. The apparatus comprises a flying magnetic head, wherein the flying magnetic head comprises: a slider that flies over a magneto-optical disc during read and write operations performed on a magneto-optical disc; a magnetic coil fixedly attached to the slider, the magnetic coil defining a channel through the slider, the magnetic coil and the slider forming a smooth, planar surface parallel to a surface of the disc during read and write operations; and a first objective lens fixedly attached in the channel such that a surface of the first objective lens is parallel to the smooth, planar surface.

13 Claims, 8 Drawing Sheets

FIG_1 (PRIOR ART)

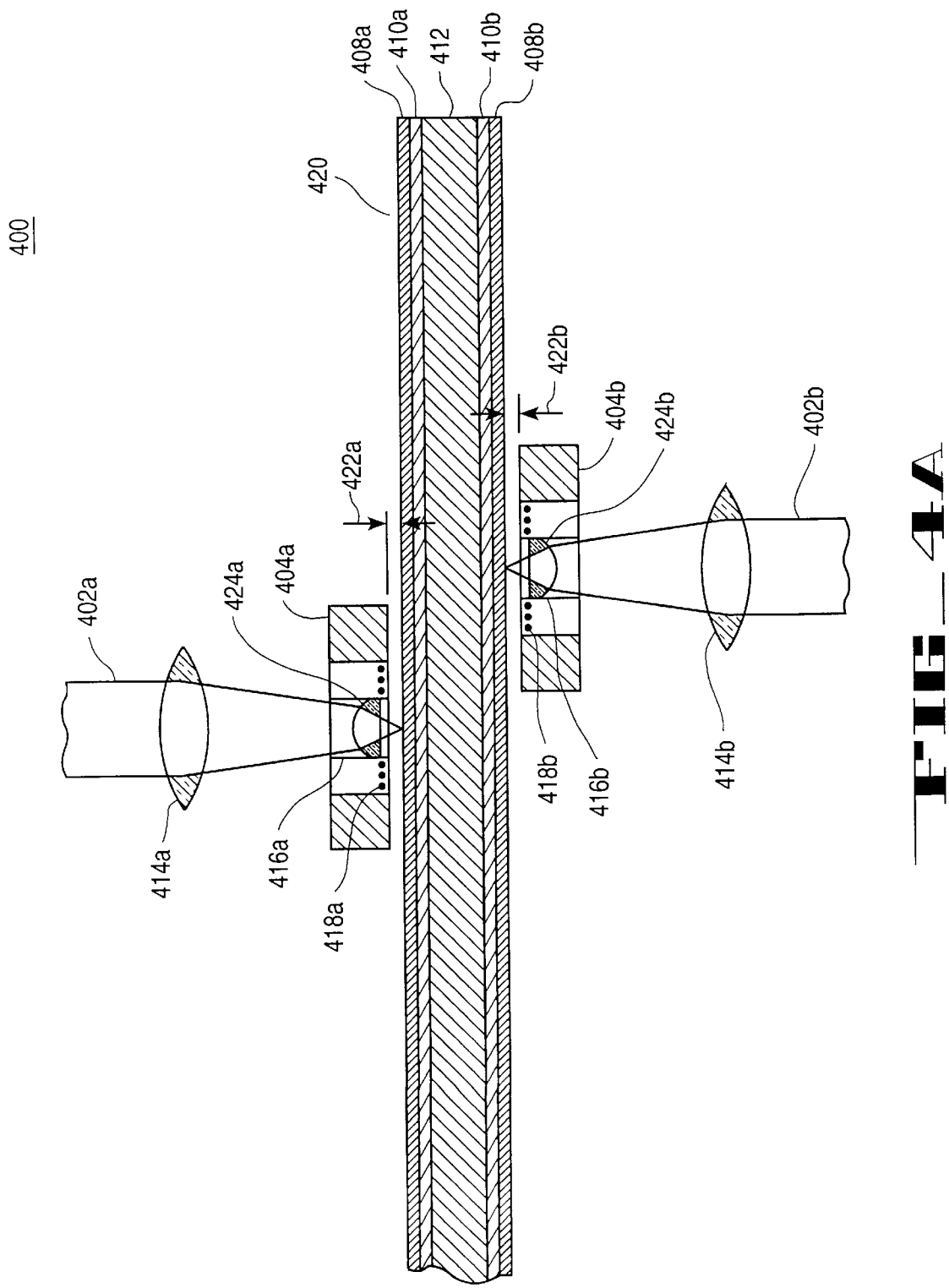

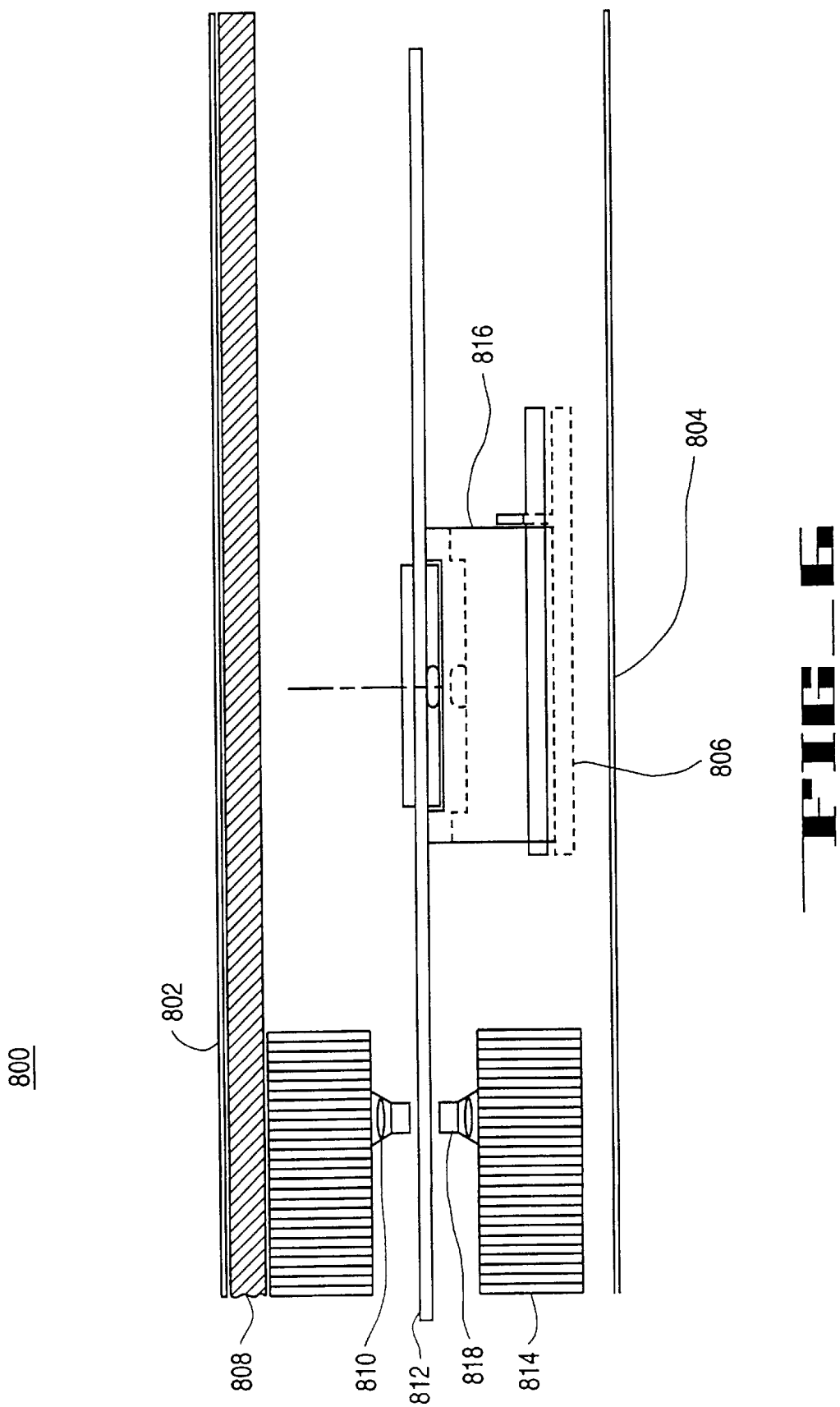
FIG_6

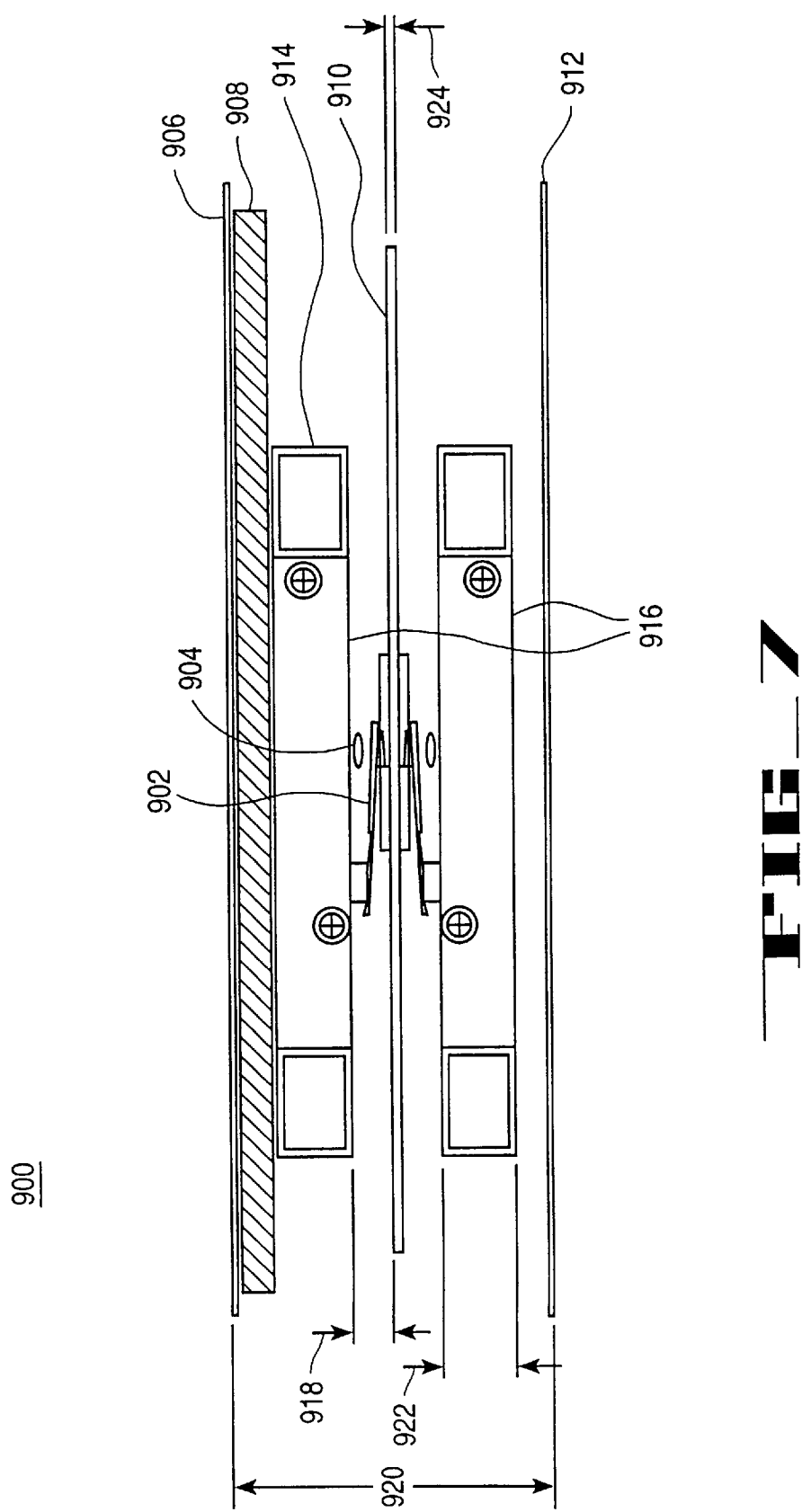

METHOD AND APPARATUS FOR READING AND WRITING MAGNETO-OPTICAL MEDIA

FIELD OF THE INVENTION

The present invention is in the field of disc drive mechanisms for reading data from and writing data to data storage discs. More particularly, the present invention is in the field of magneto-optical (MO) disc drives.

BACKGROUND OF THE INVENTION

Typical magneto-optical (MO) disc drives record data by locally heating a portion of the disc. MO discs, or media, include a recording layer of a magnetic material. The coercivity of the heated portion of the media is lowered when it is heated by the laser beam. This allows the magnetic polarity in that area to be reversed by an applied magnetic field. In such disc drives, data is read from media by illuminating areas of the storage media with a linearly polarized laser beam. The Kerr rotation effect causes the plane of polarization of the illuminating beam to be rotated. The direction of rotation depends on the magnetic polarity in the illuminated area of the storage media. When the disc is read, the polarization rotation is determined with a pair of optical detectors and a polarization beam splitter to produce an output data signal. Limitations of MO disc drives include data access time and density with which data can be stored.

FIG. 1 is a diagram of one prior MO recording system typically used with 130 mm (mm) diameter MO media. System 100 is an example of a "substrate incident" recording system. In substrate incident systems, laser light is incident on a thick substrate layer, travels through the substrate layer and is focused on a recording layer below the substrate layer. System 100 includes objective lens 102 for focusing a collimated beam of light on disc 116. Disc 116 is an example of a typical two-sided MO disc. MO disc 116 includes substrate layers 104 and 114 forming outside layers on opposing sides of disc 116. Substrate layers of 104 and 114 are made of materials such as plastic polycarbonate and are approximately 1.2 mm thick. Recording layer 106 is below substrate layer 104, and recording layer 112 is below substrate layer 114. Recording layers 106 and 112 can be made out of any one of a number of well-known materials, such as Tb—Fe—Co, a rare-earth transition-metal alloy. The laser light beam passing through objective lens 102 penetrates substrate layer 104 as shown and is incident on a focal point on the surface of recording layer 106.

System 100 has several disadvantages. One of the disadvantages of system 100 is that it is necessary to apply energy to the recording layer to erase data prior to writing new data. This is because a large, stationary magnetic coil (not shown) having a large inductance is situated on the opposite side of disc 116 from objective lens 102 to assist in the writing process. Because the coil is held at a relatively great distance form the media surface and has a relatively large inductance, the magnetic field cannot be reversed at high frequencies. Therefore, it is necessary to erase data before writing new data. The necessity of erasing before rewriting slows the process of writing data to disc 116.

Another disadvantage of system 100 is that the density of data stored on disc 116 is relatively low. A further disadvantage of system 100 is that only one side of disc 116 can be accessed at one time. This is because the relatively large coil occupies the space on the side of the disc opposite the objective lens. This space cannot therefore be used for another lens and actuator. In order to access a different side of disc 116, disc 116 must be removed, turned over, and reinserted into system 100. Disc 116, however, provides good data security because relatively thick substrate layers 104 and 114 allow disc 116 to be handled without danger of data loss or difficulty in reading data because of contamination.

FIG. 2 is a diagram of another prior MO recording system 200. Collimated light beam 202 passes through objective lens 204 to disc 216. Disc 216 includes substrate layer 206 that is typically 0.6–1.2 mm thick. Disc 216 further includes recording layer 208 between substrate layer 206 and protective layer 210. In system 200, the large, stationary coil of system 100 is replaced by a relatively small coil in flying magnetic recording head 214. Flying height 212 is maintained by an air bearing created when disc 216 passes under flying magnetic recording head 214. For writing to disc 216, a magnetic field created by magnetic recording head 214 is used in conjunction with collimated light 202 which passes through objective lens 204. The smaller coil of magnetic recording head 214 has less inductance than the large, stationary coil of system 100. The reduced inductance allows direct overwrite of data on disc 216 by switching the magnetic field.

System 200 still possesses the disadvantage of relatively low storage densities, however. In addition, disc 216 is a one-sided, rather than a two-sided disc, reducing overall storage capacity.

System 200 also has the disadvantage of requiring mechanical coupling of light on one side of disc 216 and magnetic recording head 214 on the other side of disc 216. Typically, this coupling is accomplished by mechanical linkages that pass from objective lens 202 to magnetic recording head 214 around the edge of disc 216. The mechanical linkages cannot be allowed to interfere with the movement of objective lens 202 (during focussing) or with disc 216.

FIG. 3 is a diagram of prior MO recording system 300. System 300 is an example of an "air incident" design in which a lens is held very close to the media and laser light is incident on very thin protective layer 309 that is over recording layer 308 of disc 318. System 300 employs flying magnetic recording head 316, and a two-piece objective lens comprised of lens 314 and lens 312. Prior art systems similar to system 300 use other lens designs, for example, three-piece objective lens designs. Lens 314 is held extremely close to disc 318. Collimated light beam 302 passes through lens 312 and lens 314. Lens 312 and lens 314 are integrated with slider 304 and magnetic recording head 316. Flying height 306 for system 300 is typically less than the wavelength of the laser light used in reading from and writing to MO disc 318.

Disc 318 has an MO recording layer 308 over substrate layer 310. Because in system 300, flying objective lens 314 is in close proximity to disc 318, the need for a focus actuator is eliminated. As is known, focus actuators are mechanisms that adjust the height of an objective lens over a disc during read and write operations. In the case of system 300, the height of flying objective lens, and thus the focus of flying objective lens 314, is determined by the air bearing created between slider 304 and recording layer 308 during flight.

By maintaining the spacing between flying objective lens 314 and recording layer 308 at less than the wavelength of the laser light used, laser light can be focused in the near field mode of operation. As is known, the near field mode of operation uses the phenomenon of evanescent coupling, which requires that the objective lens be held very close to the recording layer. The use of evanescent coupling to perform recording allows a smaller spot size, and therefore, greater recording densities and better data throughput.

System 300 has several disadvantages. For example, the surface of layer 309 and the surface of lens 314 closest to the disc can be contaminated, causing permanent damage to data and to the disc drive system.

Another disadvantage of system 300 stems from the fact that because there is one objective lens and no focus actuator, the flying height must be tightly controlled. Variations in the flying height and thickness of protective layer 309 (if there is a protective layer; it is possible to have none) over the recording layer must be controlled within the depth of focus tolerance of the flying lens. Generally, the tolerance of flying height 306 and protective layer 309 thickness is a percentage of the nominal thickness. Therefore, in order to reduce the tolerance, the nominal thickness of protective layer 309 must be reduced. For example, the depth of focus tolerance is generally plus or minus 0.5 micron. A typical tolerance in applying protective layer 309 is ten percent of the thickness of the protective layer. Therefore, flying height 306 and the thickness of protective layer 309 together must be very small for the thickness variation of protective layer 309 to be less than 0.5 micron.

In the case of a near field system such as system 300, the flying height (the distance between the bottom surface of flying lens 314 and the surface of recording layer 308) must be less than the wavelength of the laser light. The wavelength of the laser light is typically 700 nanometers. Therefore, the thickness of a protective layer on recording layer 308 would have to be on the order of 25 nanometers. This is extremely thin and would not protect data on recording layer 308 from manual handling in a removable disc application, or from corrosion or contamination during shelf life. Even with the protection of a cartridge that covers disc 318, some contamination from particles in the atmosphere or from humidity or corrosive gases is inevitable over time.

Conventional disc drives all share similar disadvantages related to access of data on a storage disc. Current disc drives, even those designed to access two-sided media, are limited to accessing one side of the media at a time. It has not been possible, previously, to simultaneously and independently access both sides of a two-sided disc. One of the reasons for this is that reading/writing head mechanisms on either side of the disc are constructed to move together or not at all. Current disc drives therefore have limited data access speeds. This disadvantage is shared by previous MO drives and drives using other technologies, such as those used in computer hard disc drives.

Technology exists to make multiple disc drives appear to a client device as a single drive. Redundant arrays of independent drives (RAIDs) divide incoming data into multiple streams which are written to multiple drives simultaneously. RAID drives can be used to increase throughput by dividing a single incoming data stream and writing portions of it to multiple drives simultaneously. RAIDs can also be used to achieve data redundancy by sending different copies of the same data to multiple drives simultaneously. Although access speed can be increased by using RAIDs, RAIDs are expensive and complex because they are merely devices containing duplicate conventional disc drives, each of which has all the limitations previously discussed with respect to current disc drives.

SUMMARY OF THE INVENTION

It is an object of the invention to provide an MO drive that enables higher density data storage on one-sided or two-sided media that is coated to enable handling of the media without risk of data loss.

It is another object of the invention to provide an MO drive that enables direct overwrite of data without initial erasure.

It is a further object of the invention to provide an MO drive that accesses both sides of a two-sided disc simultaneously and independently.

A method and apparatus for magneto-optical storage and access of data is described. The apparatus comprises a flying magnetic head, wherein the flying magnetic head comprises: a slider that flies over a magneto-optical disc during read and write operations performed on a magneto-optical disc; a magnetic coil fixedly attached to the slider, the magnetic coil defining a channel through the slider, the magnetic coil and the slider forming a smooth, planar surface parallel to a surface of the disc during read and write operations; and a first objective lens fixedly attached in the channel such that a surface of the first objective lens is parallel to the smooth, planar surface.

BRIEF DESCRIPTION OF THE DRAWINGS

FIG. 4A is a diagram of a MO data storage and retrieval system according to one embodiment of the present invention.

FIG. 6 is a partial side view of the MO drive of FIG. 5.

FIG. 7 is a partial end view of the MO drive of FIG. 5.

DETAILED DESCRIPTION

Figure 1:
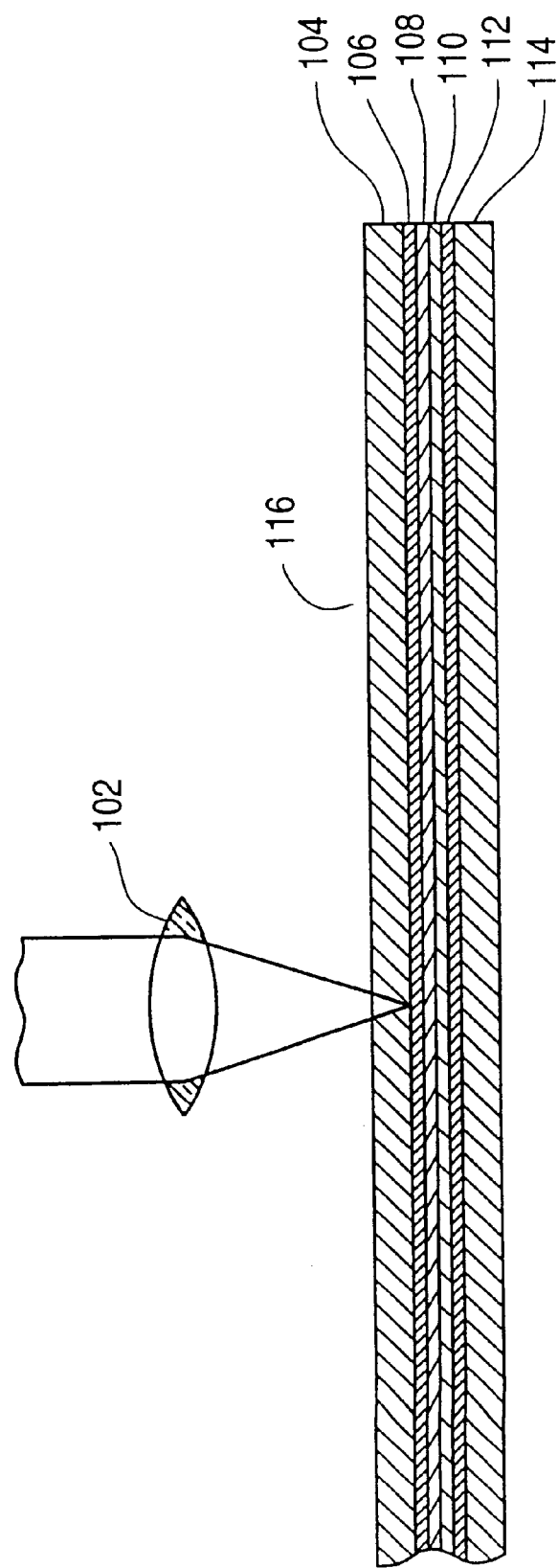
FIG. 1 is a diagram of a prior art magneto-optical (MO) data storage and retrieval system.
Figure 2:
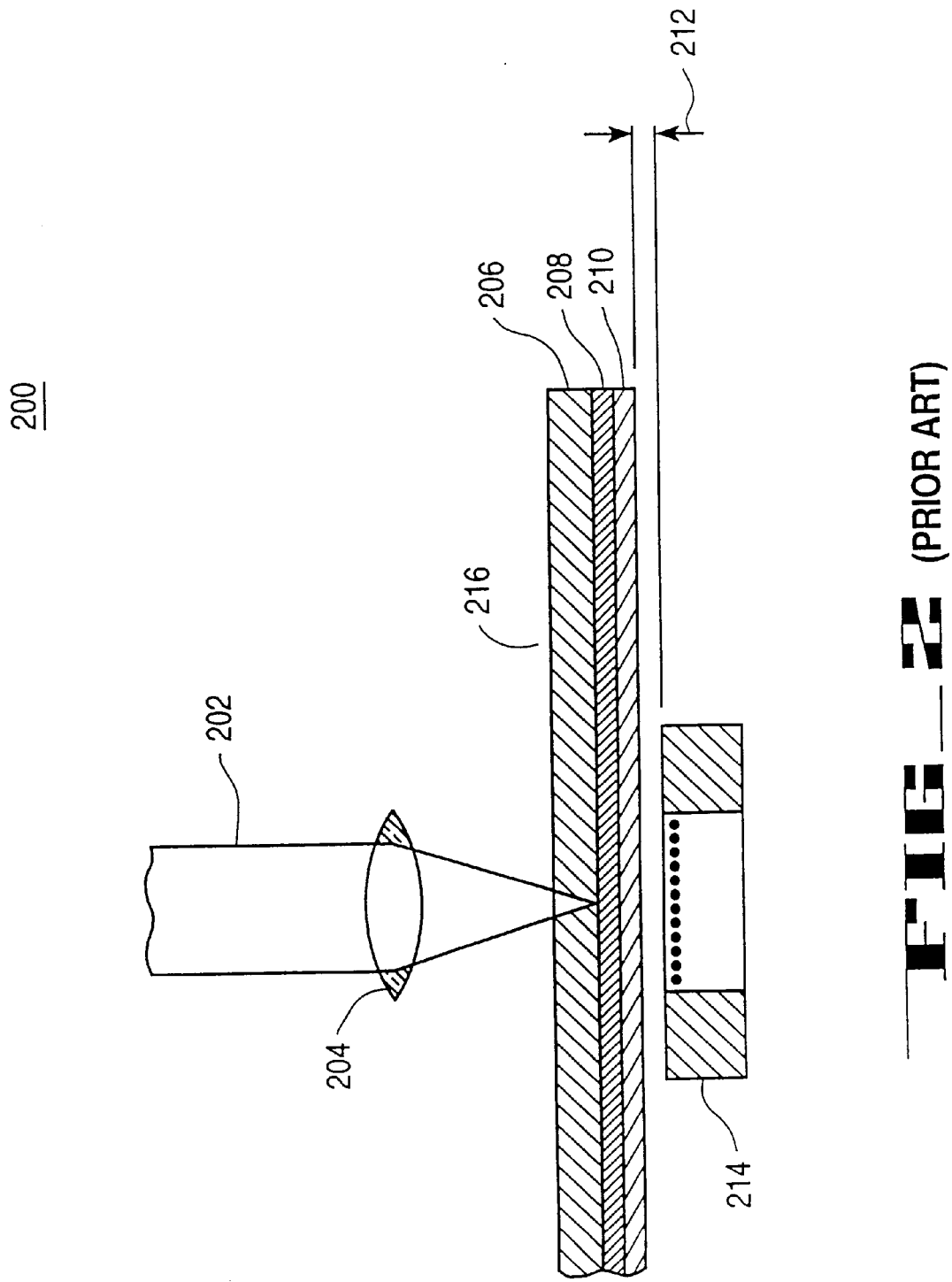
FIG. 2 is a diagram of a prior art MO data storage and retrieval system.
Figure 3:
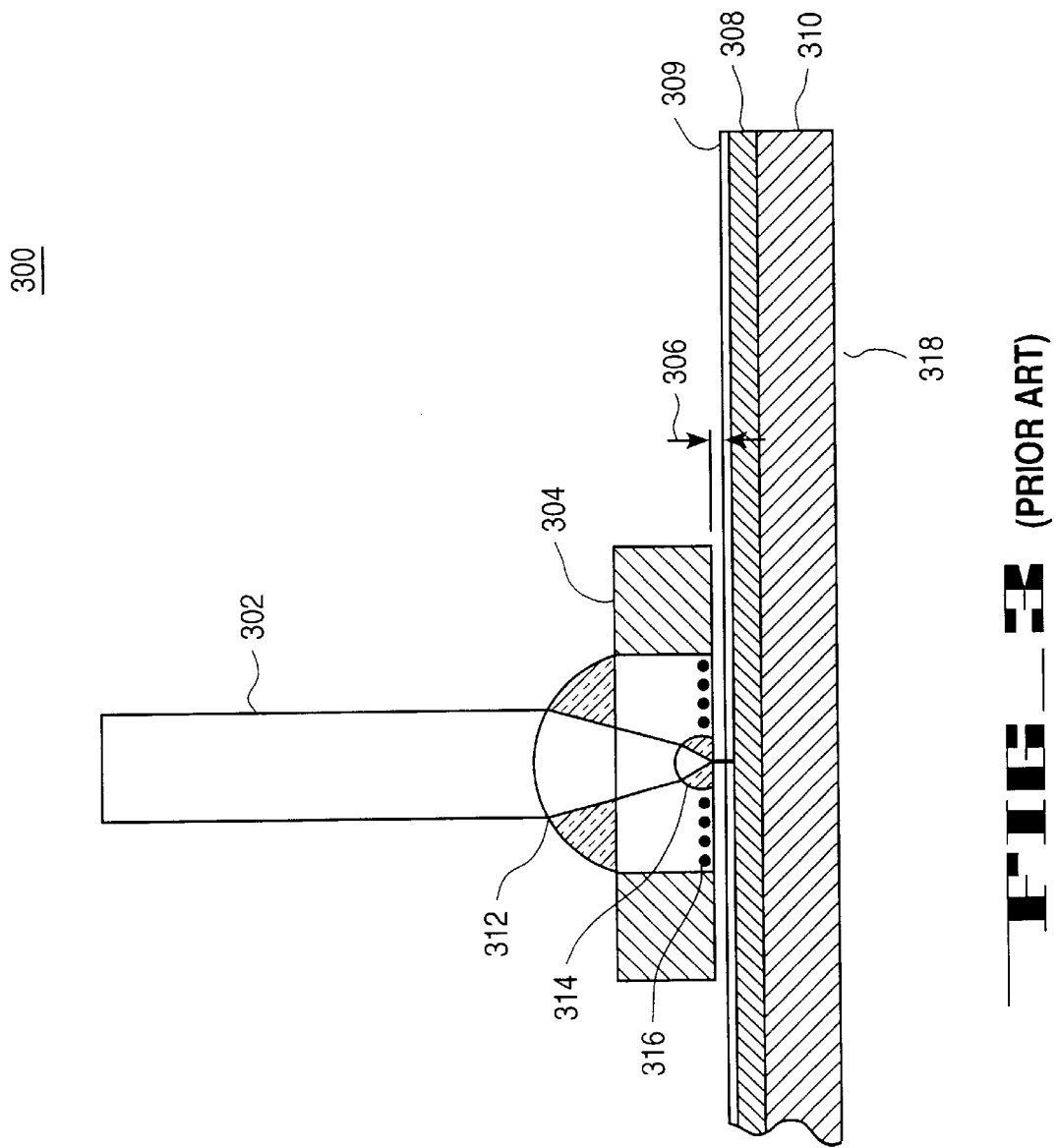
FIG. 3 is a diagram of a prior art MO data storage and retrieval system.

The present invention includes a magneto-optical (MO) disc drive and an MO disc. Far field recording is performed with a first objective lens that focuses collimated laser light that then passes through a second objective lens that is fixed in a light channel in a flying magnetic head. The flying magnetic head flies above the MO disc during data access operations. Higher numerical aperture is achieved over prior techniques that use protected media. Consequently, increased data storage densities are achieved over conventional storage techniques that use protected media. In one embodiment, the MO disc (media) includes two recording layers covered with protective coating layers that guard data from damage even during manual handling of the MO disc. In one embodiment, a flying magnetic head with an integrated objective lens is situated on each side of the MO disc. An objective lens is also situated on each side of the MO disc above the flying magnetic heads. Magnetic heads and objective lenses on respective sides of the MO disc are independently actuated to allow simultaneous and completely independent access to both sides of the MO disc.

FIG. 4A is a diagram of an MO data storage and retrieval system 400 according to one embodiment of the present invention. In FIG. 4A, elements that are similarly numbered except for an "a" or "b" are identical, or functionally equivalent. For example, objective lens 414a is identical, or functionally equivalent to, objective lens 414b. Therefore, functionally equivalent elements will be described with reference to one of the similarly numbered elements.

Objective lens 414a focuses collimated laser light beam 402a. Flying heights 422a and 422b are each 0.05 to 5.0 microns above respective surfaces of MO disc 420 depending upon the specific embodiment. Magnetic recording heads 418a and 418b produce magnetic fields with relatively low inductance, allowing direct overwriting of data upon switching the magnetic field. The preferred embodiment uses magnetic field modulation for reading and writing operations, which is a known technique. Higher storage densities can be accomplished by modulating magnetic fields produced by magnetic recording heads 418a and 418b during write and read processes.

Figure 4B:
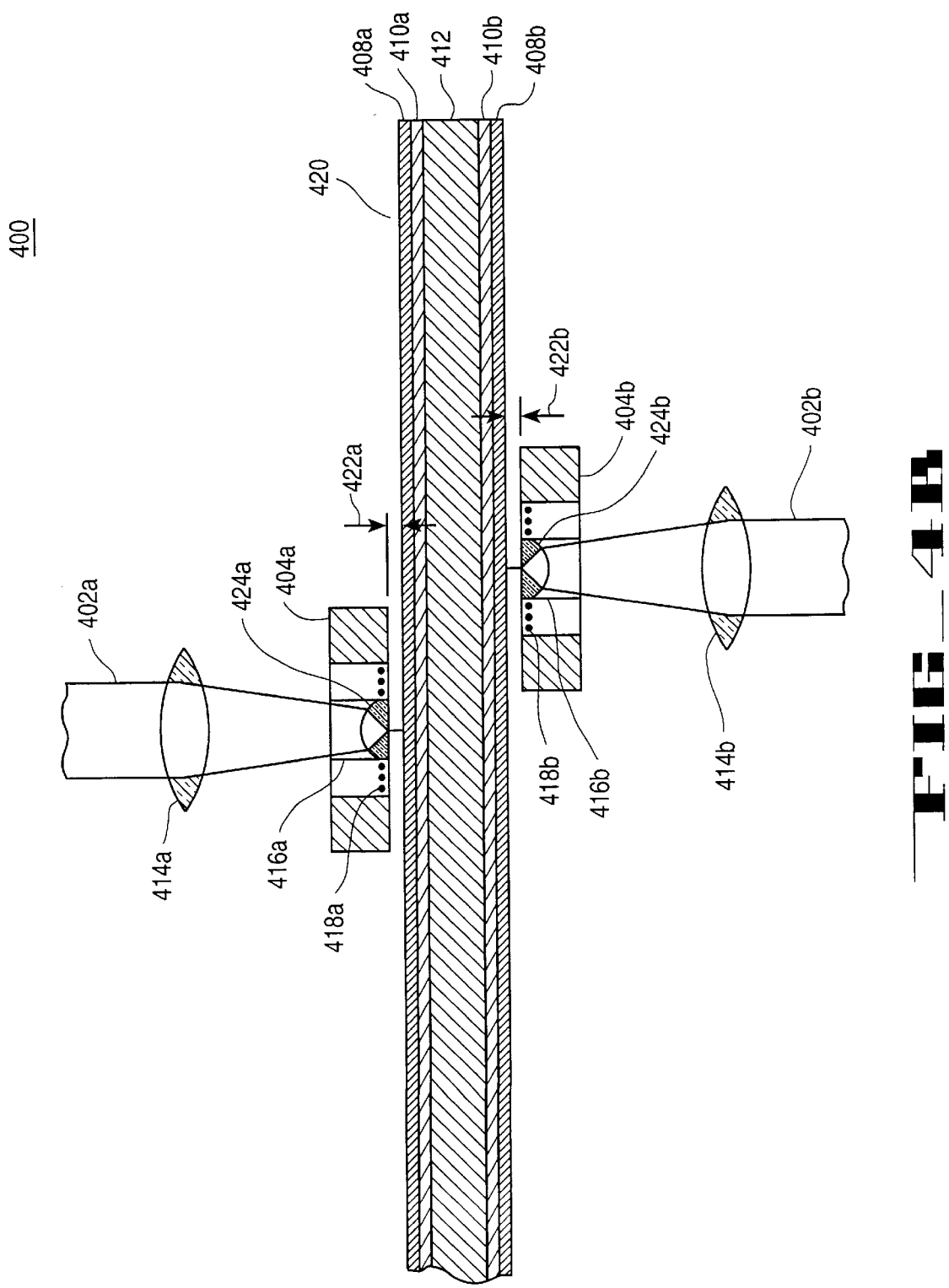
FIG. 4B is a diagram of a MO data storage and retrieval system according to another embodiment of the present invention.

Magnetic recording head 418a includes light channel 416a which is a hole through the center of magnetic recording head 418a. Objective lens 424a, in this embodiment, is a solid immersion lens (SIL) that is fixed in light channel 416a as shown. Lens 424a is a flying objective lens in parallel to MO disc 420. In this embodiment, lens 424a is recessed in magnetic recording head 418a. Because lens 424a is recessed, it is protected from contamination that could damage lens 424a and degrade performance of system 400. In the embodiment of FIG. 4B, lens 424a is coplanar with the surface of magnetic recording head 418a. In cases where lens 424a flies a distance above disc 420 which is less than the wavelength of the laser light, the embodiment of FIG. 4B achieves near field recording.

Because MO disc 420 includes coating layer 408a over recording layer 414a, the system of FIG. 4A records data using a far field technique, rather than a near field technique. The distance between lens 424 and MO disc 420 does, however, reduce parallelism or tilt concerns caused by relative attitudes of the surfaces of MO disc 420 and lens 424a. Therefore, many mechanical tolerances of the drive mechanism and disc are eliminated and a higher numerical aperture (NA) is achieved. NAs greater than 0.85 are achieved, resulting in higher data storage densities than were possible with the approximately 0.55 NA previously achievable with far field MO techniques.

Slider 404a is integrated with magnetic recording head 418a and enables magnetic recording head 418a to fly above MO disc 420 on an air bearing when disc 420 is spinning. The embodiment of FIG. 4A records data on MO disc 420 using a far field technique. In far field recording techniques, the focal distance (the distance from a focal point on a recording layer of MO media to an objective lens) is greater than the wavelength of incident light of collimated light beam 402a. In this embodiment, the focal distance is relatively large, and thus lens 424a is not in contact with, or in close proximity to, the recording layer.

In the embodiments of FIGS. 4A & 4B, actuators controlling objective lens 414a and magnetic head 418a are completely independent from separate actuators controlling objective lens 414b and magnetic head 418b. Therefore simultaneous and independent access of both sides of MO disc 420 takes place. For example, recording layer 410a is written to at the same time recording layer 410b is read from by respective head assemblies. Actuators are known in the art and are not shown for clarity. Objective lens 414a and objective lens 424a, in these embodiments, are flexibly coupled so that they are commonly actuated. Specifically, lens 424a moves axially as determined by the characteristics of disc 420 because lens 424a rides on an air bearing. Lens 414a moves in response to lens 424a so that focus can be maintained regardless of physical variations in the surface of disc 420.

A known flexure and gimbal suspension assembly is used to suspend each slider 404 and magnetic head 418. Suspension assemblies are not shown in FIGS. 4A & 4B for clarity. In a particular embodiment, a suspension assembly with magnetic head is loaded by spinning the disc and then engaging, or loading, the suspension assembly and magnetic head. An air bearing is formed between the slider 404 and the spinning disc such that the slider surface does not contact with the disc surface. In other embodiments, the slider rests on the disc surface when the disc is not moving. In these embodiments, the slider rests on the disc surface until the disc reaches a certain revolutionary speed, after which an air bearing is formed and the slider is separated from the disc surface.

MO disc 420, in this embodiment, has spiral grooves in both recording layers. The spiral grooves on opposite recording layers spiral in opposite directions so that the spinning disc can be accessed simultaneously from both sides. Other embodiments use a two-sided MO disc with concentric grooves. Spiral groves are preferable when data to be stored and accessed is of a sequential nature. Concentric grooves are preferable when data to be stored and retrieved is of a less sequential and more "random" nature. The embodiments shown include an MO disc with a 130 mm diameter form factor. Other embodiments use different MO discs, for example discs having 80 mm, 90 mm, or 120 mm diameter form factors.

MO disc 420 includes a central substrate layer 412. On either side of substrate layer 412 are recording layers 410a and 410b, respectively. Coating layer 408a forms one surface of MO disc 420 and covers recording layer 410a. Coating layer 408b forms the opposite surface of MO disc 420 and covers recording layer 410b.

Figure 5:
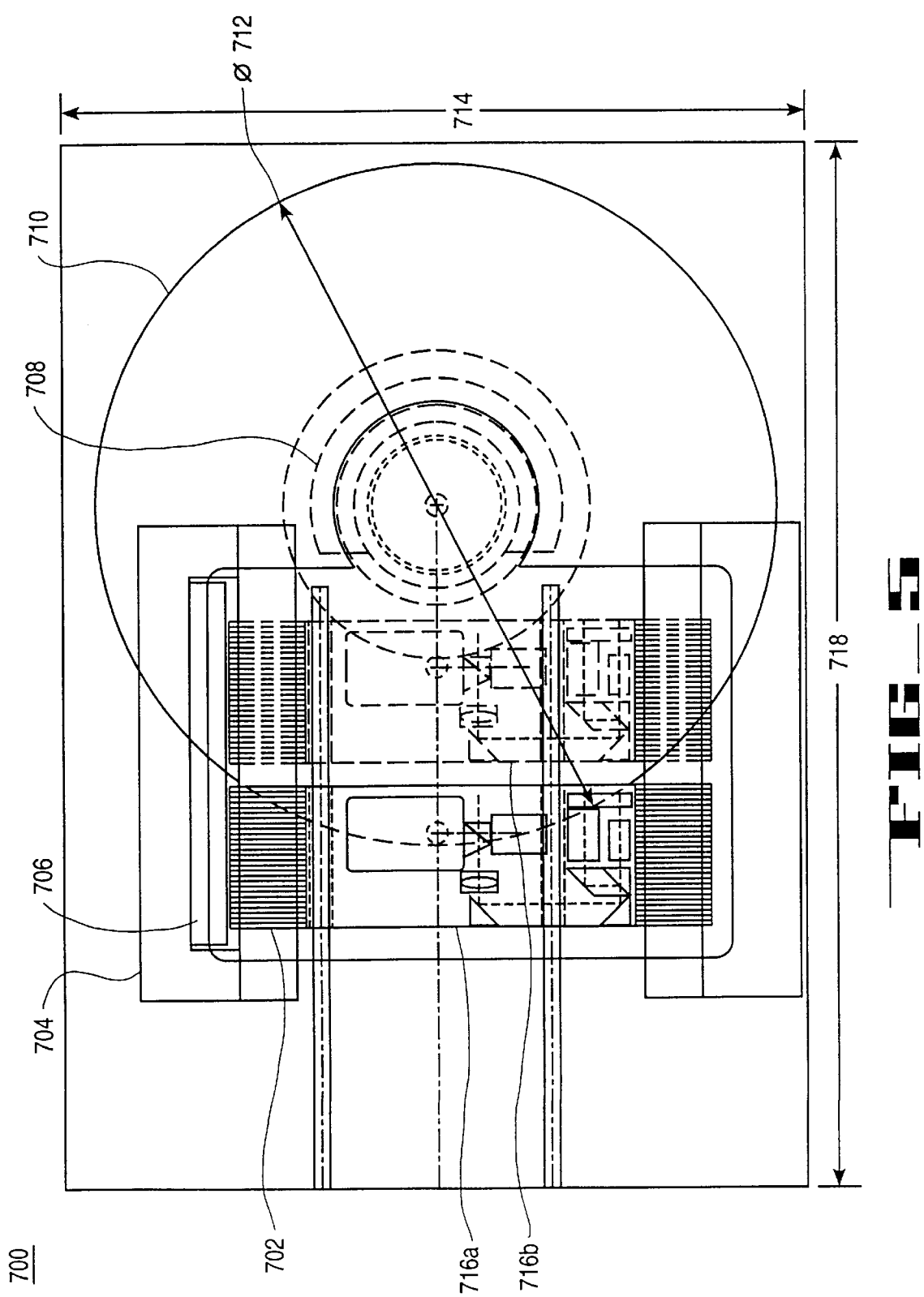
FIG. 5 is a top view of a MO drive according to one embodiment.

FIG. 5 is a top view of disc drive 700 according to one embodiment of the invention. In this embodiment, Disc drive 700 includes two optical pickup/front end electronics assemblies 716a and 716b. Assemblies 716, in this embodiment, are moved back and forth over respective sides of MO disc 710 by a linear actuator. Other embodiments could use other actuators, for example, rotary actuators.

Optical pickup/front end electronics assembly 716a is situated over one side of MO disc 710, and assembly 716b is situated over the opposite side of MO disc 710. Each of the assemblies 716 are integrated optics assemblies. As is known, integrated optics assemblies include, in one unit, a focus actuator, a tracking actuator, a coarse actuator, optical components, and front end electronics. In this embodiment, optical components include objective lenses such as lenses 414 and 424 of FIGS. 4A & 4B. In the embodiment shown in FIG. 5, integrated optics are chosen, in part, for ease of assembly. Extreme precision is required to align the optical components of the mechanism. When integrated optics are used, alignment can be performed on an assembly, such as assembly 716a, on a separate station before assembling the entire disc drive. This makes assembly faster and less expensive.

Other embodiments use split optics. Split optics include a moving portion and a stationary portion. The moving portion travels over the disc and includes an objective lens, a mirror, a fine actuator, a coarse actuator, and a focus actuator. The fixed portion includes a laser diode, a detector, optical components, and front end electronics.

In this embodiment, a focus actuator and a fine actuator are coupled to a coarse actuator. The coarse actuator performs relatively large movements laterally across the surface of the disc. The focus actuator moves axially with respect to the disc for focusing the laser light. The fine actuator performs small lateral movements, or microsteps, for keeping the focused laser light on a track of the disc. In this embodiment, a magnetic head 418, including an integrated objective lens 424, is actuated commonly with a lens 414. Lenses 414 and 424 are actuated by the focus actuator by the fine actuator.

Disc drive 700 includes carriage coil 702, return magnetic path assembly 704, and magnet 706. Spindle motor 708 engages MO disc 710 as explained more fully below. In this embodiment, dimension 718 is approximately 200 mm, dimension 714 is approximately 140 mm, and 712 is approximately 130 mm. Other embodiments of disc drive 700 could operate with MO discs of varying form factors. For example, disc drives embodying the invention could be used with MO discs as described herein, but with diameter form factors such as 80 mm, 90 mm, or 120 mm.

Disc drive 700 is an embodiment that includes two optical pickup/front end electronics assemblies. Other embodiments include only one optical pickup/front end electronics assembly that accesses one side of MO disc 710. These embodiments only read or write one side of a disc at one time.

FIG. 6 is a side view 800 of the disc drive of FIG. 5. Disc drive 700 is partially enclosed by top cover 802, bottom cover 804 and printed circuit board (PCB) assembly 808. Objective lens 810 of assembly 716a is indicated. Assembly 716a and 716b are identical, or functionally equivalent. Magnetic head and suspension 818 are indicated for assembly 716b. In this embodiment, the magnetic head is designed as a magnetic field modulation head. Magnetic field modulation techniques are known in the art. Coarse carriage coil 814 is indicated for assembly 716. Spindle motor 816 is shown engaged with disc 812. Reference number 806 designates the spindle motor in the disengaged position. Spindle motor 708 is disengaged during insertion or removal of disc 812. Spindle motor 708 moves up and engages with MO disc 710 after insertion of MO disc 710.

FIG. 7 is a diagram of end view 900 of disc drive 700. End view 900 references one magnetic head/suspension assembly 902, and objective lens 904. In this embodiment, magnetic head/suspension assembly 902 is mounted on the coarse actuator body and is not attached to focus actuator 904.

Top cover 906, bottom cover 912, and PCB assemblies 908 are also shown. Optical pickup/front end electronics assemblies 916 are shown on either side of MO disc 910. Carriage coil 914 for one assembly 916 is shown. In this embodiment, dimension 924, the thickness of MO disc 910, is 0.6–2.4 mm. In this embodiment, dimension 918 is 5 mm, dimension 922 is 10 mm, and dimension 920 is 41.3 mm.

The embodiments shown perform parallel processing of data or redundant processing of data in one disc drive. Optical pickup/front end electronics assemblies 716 of FIG. 5 are operated by independent actuators, and the incoming data stream is divided between the two assemblies to perform independent reading and/or writing to either side of MO disc 710. A user can thus choose to increase throughput, or lower access time, by using parallel access. A user can alternately choose to access both sides of MO disc 710 redundantly in order to produce backup copies of data. When parallel access mode is chosen, client devices that perform command queuing can be serviced more quickly because commands in the queue can be smoothly executed even if they are not of the same type. For example, a write operation can be performed on one side of the MO disc 710 at the same time a read operation is performed on the opposite side of MO disc 710.

The embodiments shown perform MO recording with increased data density, simultaneous, independent access to two data storage surfaces, and direct overwrite capability. Other embodiments include only one optical pickup/front end electronics assembly and therefore do not perform simultaneous, independent access to two data storage surfaces.

The invention has been described in terms of particular embodiments. For example, the embodiments shown include an MO disc of a particular form factor and a disc drive with integrated optics and linear actuators. One skilled in the art, however, may make modifications and alterations to the specific embodiments shown without departing from the spirit and scope of the invention as set forth in the following claims.

What is claimed is:

1. An apparatus for using laser light to access a magneto-optical disc comprising:

a first objective lens;

an actuator to move the first objective lens in an axial direction with respect to a surface of the magneto-optical disc;

an integrated magnetic head comprising:

a slider having a primary planar surface that flies over the surface of the magneto-optical disc during read and write operations, the slider having a light channel to permit the laser light to pass through the magnetic head;

a second objective lens fixedly mounted in the light channel; and a magnetic coil disposed about the light channel near to the primary planar surface to generate a magnetic field for reading and writing operations;

during the reading and writing operations the laser light being focused by the first and second objective lenses onto the magneto-optical disc, focus being maintained solely by the actuator moving the first objective lens in the axial direction.

2. The apparatus of claim 1, wherein the second objective lens comprises a solid immersion lens.

3. The apparatus of claim 2, wherein the second objective lens is mounted in the light channel such that a surface of the second objective lens is substantially coplanar with the primary planar surface of the slider.

4. The apparatus of claim 3, wherein the slider flies over the surface of the magneto-optical disc at a height that is less that a wavelength of the laser light.

5. The apparatus of claim 1, wherein the second objective lens is recessed in the light channel such that the second objective lens is located away from the primary planar surface of the slider.

6. The apparatus of claim 1, further comprising a suspension assembly that suspends the slider over the magneto-optical disc.

7. The apparatus of claim 1, wherein the magnetic coil has an inductance that permits a direct overwrite of data stored on the magneto-optical disc by reversing the magnetic field.

8. A magneto-optical data storage and retrieval system that includes a pair of optical assemblies, each for using laser light to access opposite sides of a magneto-optical disc, each assembly comprising:

a first objective lens;

an actuator to move the first objective lens in an axial direction with respect to a surface of the magneto-optical disc;

an integrated magnetic head comprising:
- a slider having a primary planar surface that flies over the surface of the magneto-optical disc during read and write operations, the slider having a light channel to permit the laser light to pass through the magnetic head;
- a second objective lens fixedly mounted in the light channel; and
- a magnetic coil disposed about the light channel near to the primary planar surface to generate a magnetic field for reading and writing operations;

during the reading and writing operations the laser light being focused by the first and second objective lenses onto the magneto-optical disc, focus being maintained solely by the actuator moving the first objective lens in the axial direction.

9. The magneto-optical data storage and retrieval system of claim 8, wherein the second objective lens comprises a solid immersion lens.

10. The magneto-optical data storage and retrieval system of claim 9, wherein the second objective lens is mounted in the light channel such that a surface of the second objective lens is substantially coplanar with the primary planar surface of the slider.

11. The magneto-optical data storage and retrieval system of claim 10, wherein the slider flies over the surface of the magneto-optical disc at a height that is less that a wavelength of the laser light.

12. The magneto-optical data storage and retrieval system of claim 8, wherein the second objective lens is recessed in the light channel such that the second objective lens is located away from the primary planar surface of the slider.

13. The magneto-optical data storage and retrieval system of claim 8, wherein the optical assemblies are configured to permit independent and simultaneous data access to both sides of the magneto-optical disc.

* * * * *